Aug. 18, 1970     M. KOTLER ETAL     3,524,573
INTERMITTENT FILM TRANSPORT MEANS
FOR MOTION PICTURE PROJECTOR

Filed Aug. 9, 1968     3 Sheets-Sheet 1

INVENTORS
MAX KOTLER
FRANK E. RAVESE
BY
ATTORNEY

Aug. 18, 1970

M. KOTLER ETAL 3,524,573

INTERMITTENT FILM TRANSPORT MEANS
FOR MOTION PICTURE PROJECTOR

Filed Aug. 9, 1968

INVENTORS
MAX KOTLER
FRANK E. RAVESE
BY
James F. Franklin
ATTORNEY

United States Patent Office 3,524,573
Patented Aug. 18, 1970

3,524,573
INTERMITTENT FILM TRANSPORT MEANS FOR MOTION PICTURE PROJECTOR
Max Kotler, Montvale, N.J., and Frank E. Ravese, Brooklyn, N.Y., assignors to DeJur-Amsco Corporation, Long Island City, N.Y., a corporation of New York
Filed Aug. 9, 1968, Ser. No. 751,398
Int. Cl. G03b 1/22
U.S. Cl. 226—62                    6 Claims

ABSTRACT OF THE DISCLOSURE

An intermittent film transport means in a motion picture projector operable at a determined film transport cyclic speed in which mechanism is provided for changing the speed for movement of the film driven by said intermittent film transport means between (a) a film movement corresponding to said determined cyclic speed for normal projection, (b) a film movement which is a fraction of said determined cyclic speed for slow motion projection, and (c) a stoppage of the movement of the film for "still" projection.

---

This invention relates to a motion picture projector.

A prime object of the invention is the provision of a motion picture projector which, in combination with an intermittent film transport means operating at a determined cyclic speed, embodies an improved mechanism for changing the speed of movement of the film driven by said intermittent film transport means between (a) a film movement corresponding to said determined cyclic speed for normal projection, (b) a film movement which is a fraction of said determined cyclic speed for slow motion projection and (c) a stoppage of the movement of the film for "still" projection.

Present methods and mechanisms for producing slow motion projection generally employ a plurality of cams or cam elements which are selectively operable for effecting a positive engagement of the film transport means of the projector for effecting its film penetration phase. In one form thereof, two cams or cam elements rotating at the same speed are used, one cam or cam element having twice as many cam projections or lobes as the other. The operating lobes of the cams control the frequency and depth of penetration into the film perforations by the claw tip of the transport means. The first cam or cam element, having twice as many projections or lobes as the second cam, and each lobe operating in one to one synchronism with the pull-down of the film transport claw, causes the film to be transported from frame to frame, one frame per pull-down stroke of the transport means. The second cam or cam element, having one half the number of operating lobes as the first cam, and effectively operating on a one to two ratio with the pull-down stroke of the transport means, causes the film to be transported one frame per two strokes of the transport means, or every other stroke. Such mechanisms, requiring positively cam driven engagement of the claw of the transport means for film penetration have certain drawbacks, such as subjecting the film perforations to the liability of tearing.

Present methods of and mechanisms for producing "still" projection are generally based upon disengaging the motor of the projector, while running, from the transmission mechanism thereby stopping film movement. Another mechanism relates to preventing the pull-down claw from entering the film perforation by the use of a third cam or cam element in conjunction with the two cams or cam elements described above for slow motion such that there are no projections or lobes thereon, which cam is in effect an idler acting on the pull-down claw device so as to inhibit penetration of the film by the pull-down claw. Such latter mechanisms undesirably involve continued motor operation of the third cam or cam element active on the transport claw device during the "still" picture projection.

On the mehod of producing slow motion projection, the projector of the present invention is characterized by the provision of a film transport means which for its film perforation penetration is actuated by a spring-biased means, which is employed in conjunction with a cam operated means operable at said cyclic speed and active on the transport means in opposition to said spring-biased means for effecting an outward movement of the transport means for film perforation disengagement for each film transport cycle, there being combined therewith a second cam operable at a speed which is a fraction of said cycle speed and a device manually movable into and out of operation with said second cam. The said device is provided with a part movable into the transport path of the transport means to intercept the inward movement thereof so as to inhibit its engagement with said first cam operated means when said manually moved device is moved into operation with said second cam. With this mechanism, involving in itself a simplified structure compared with those of prior mechanisms, the risk of tearing the film at its perforations is reduced to a minimum.

On the method of producing "still" projection, the projector of the present invention is characterized by the provision of a manually controlled element which is selectively movable into the transport path of the transport means to intercept the inward movement thereof to inhibit its engagement with the first cam operated means to prevent or inhibit film penetration of the transport means, which elment may be held in such intercepting position for any desired period. With this mechanism the need for employing a cam element which is maintained positively active on the transport means is obviated. Also such a mechanism readily lends itself to the provision of automatic control means for operating said element to effect a sequence of "still" film projections.

To the accomplishment of the foregoing objects the invention relates particularly to a motion picture projector as defined in the accompanying claims considered with the following specification and the appended drawings, in which:

Figure 1:
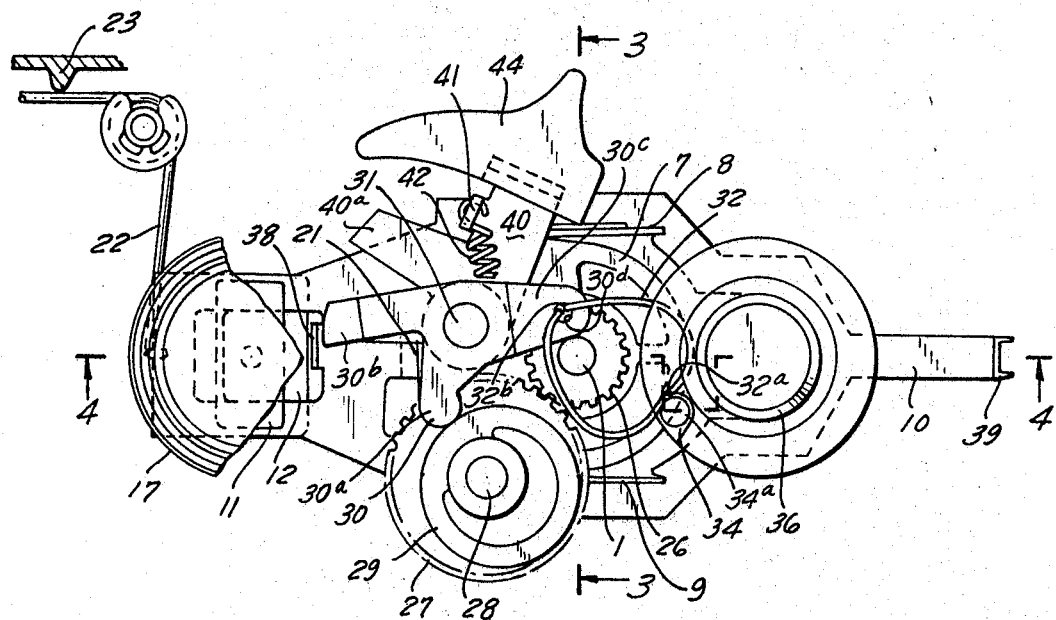
FIG. 1 is a plan view of the essential parts of the film transport mechanism of the projector of the present invention.
Figure 2:
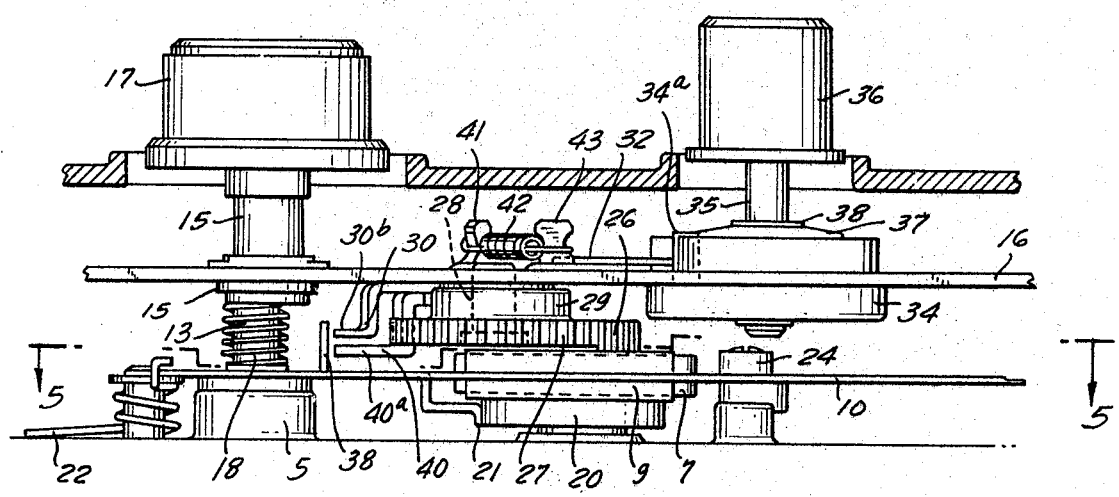
FIG. 2 is a full view projection of the plan view of FIG. 1.
Figure 3:
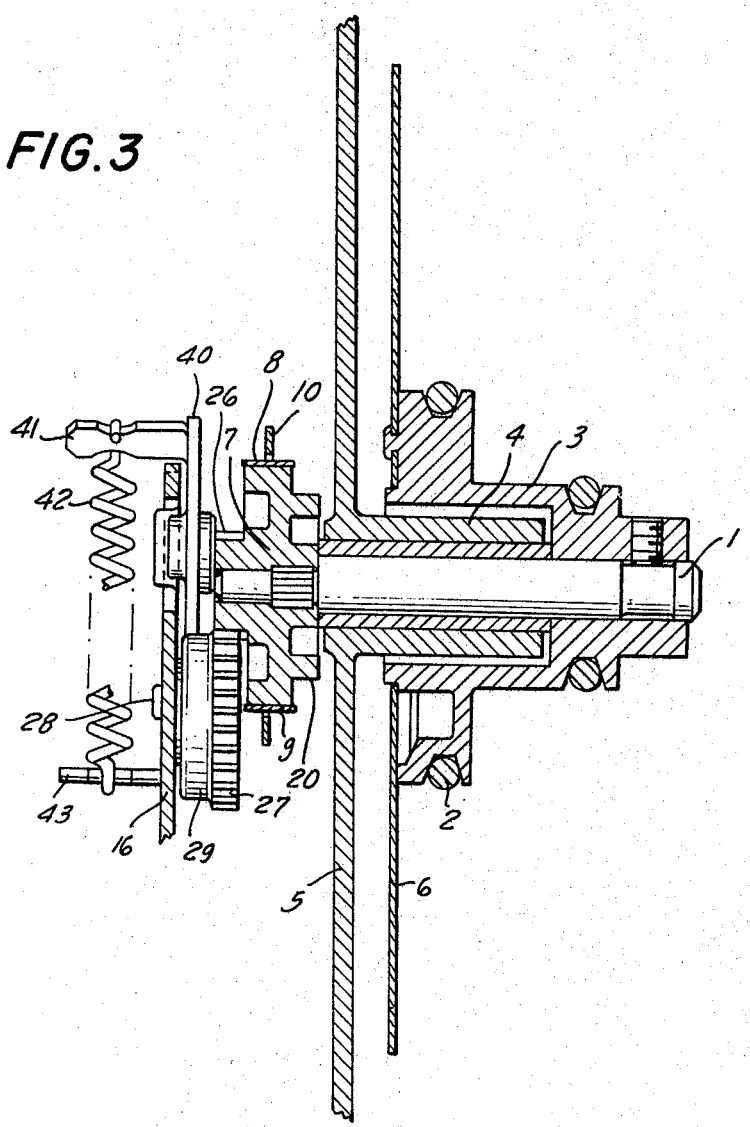
FIG. 3 is a view of FIG. 1 taken in cross-section in the plane of the line 3—3 of FIG. 1.

In the projector system shown, power is obtained from a source through a suitable transmission (not shown) and is delivered to the main drive shaft 1 by drive belt 2 connected to a compound pulley 3 affixed to the shaft 1 as clearly shown in the drawings. Shaft 1 rotates in a bearing 4 which is mounted in the main support structure 5 of the projector. A shutter blade 6 is affixed directly to the compound pulley 3.

The projector of the present invention is characterized by the provision of a film transport means which for its film perforation penetration is activated by a spring-biased means, employed in conjunction with a cam operated means operable at a predetermined cyclic speed and which cam operated means is active on the transport means in opposition to said spring-biased means for effecting an outward movement of the transport means for film perforation disengagement for each film transport cycle.

Such film transport means comprises a cam 7 affixed to the main shaft 1, which cam rotates between shoes 8 and 9 acting as cam followers, which shoes form part of a film transport means 10. Said cam 7 is operable in both clockwise and counterclockwise modes. Film transport means 10 is pivotally movable about a retainer 11, which latter comprises a positional bearing serving both as a pivot about which the film transport means 10 oscillates and as a confining element such that slidable in and out motion of the film transport is permitted.

Pin 13 is eccentrically positioned with respect to a control shaft 14, which latter is rotatably mounted in a bearing 15 held in a frame plate 16. A manually operable knob 17 is keyed to the control shaft 14. A spring 18 located around an extension of the pin 13 applies pressure against the retainer 11. A change of angular position of the pin 13 with relation to the shaft 14 and the cam 7 has the effect of shifting the fulcrum about which the film transport means 10 oscillates and translates, thus changing the points of penetration of the film perforations by the claw (hereinafter referred to) of the film transport means for framing the film in the projector. In the accompanying drawings as shown particularly in FIG. 5 thereof, the film transport means is shown in mid-position of its return or "up" stroke movement when cam 7 rotates clockwise in the forward mode. Conversely, the illustration in the drawings may also be viewed with the cam 7 operating in the reverse mode (counter-clockwise) thus illustrating the position of the film transport means in mid-position in the down stroke.

Penetration of film perforation by the film transport means is controlled by a first cam 20 which is affixed to or made integral with cam 7 (the pull-down cam) and thus operates at the aforesaid determined cyclic speed. The film transport means 10 is formed with an arm extension 21 which engages the peripheral surface of the cam 20 serving as the cam follower.

Figure 5:
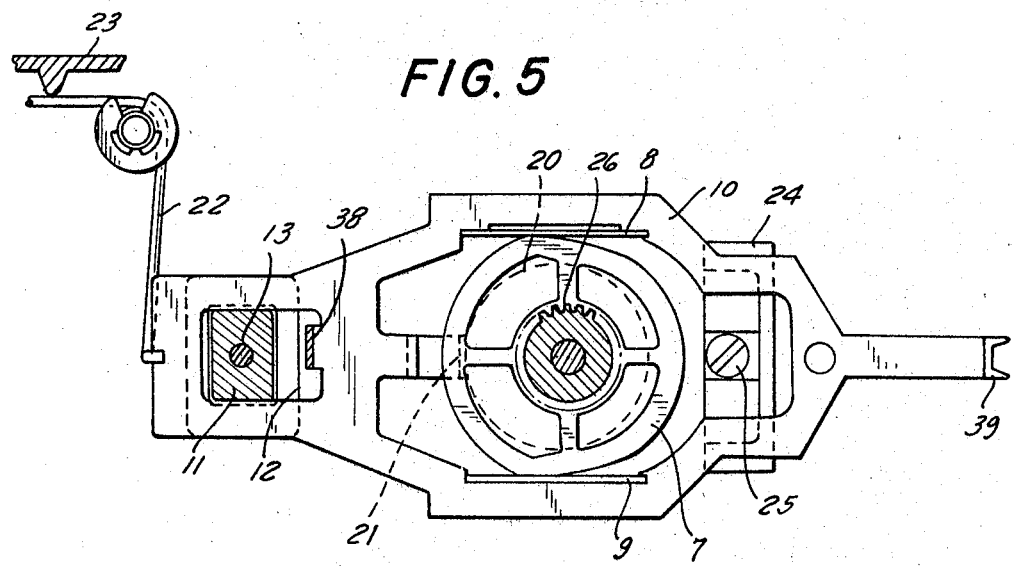
FIG. 5 is a fragmentary view of FIG. 2 taken in cross-section in the planes of the broken line 5—5 thereof.
Figure 4:
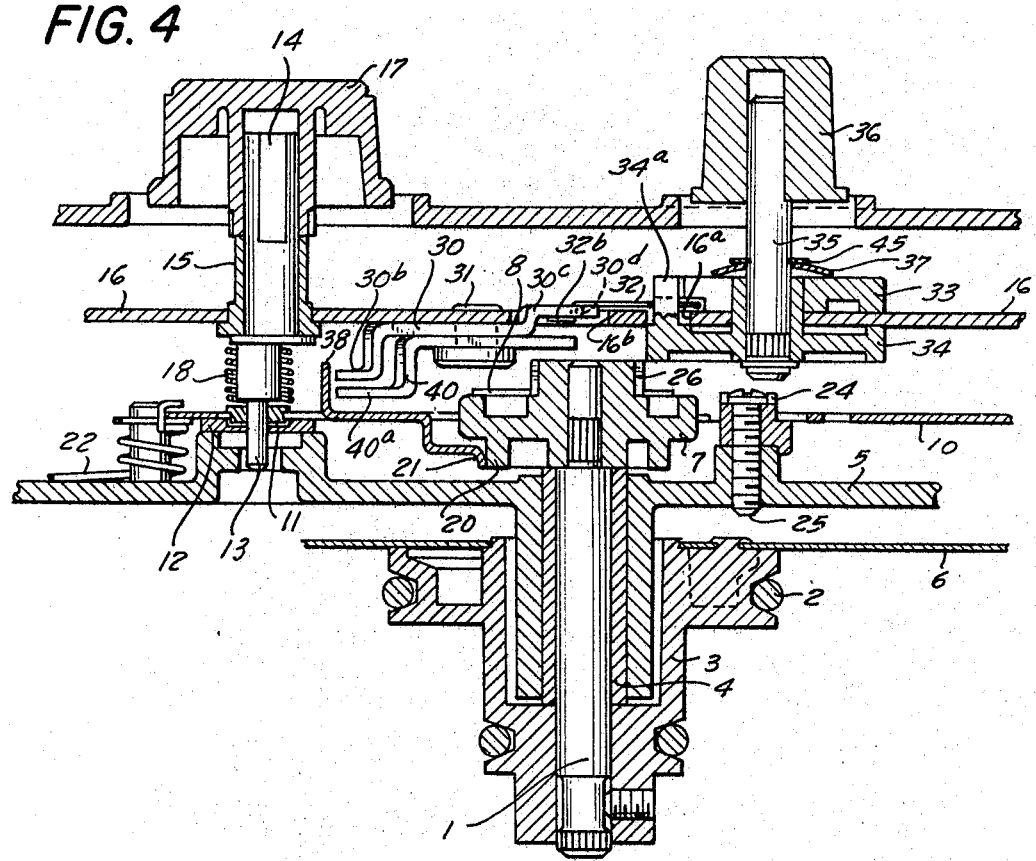
FIG. 4 is a view of FIG. 1 taken in cross-section in the plane of the line 4—4 of FIG. 1.

The spring-biased means which is active on the film transport means to effect an inward translatory movement thereof for film perforation comprises a torsion spring 22 active at one end on the end of the film transport means 10, as clearly depicted in FIGS. 4 and 5 of the drawings, exerting pressure thereon in a generally longitudinal direction through the center pin 13 and the main shaft 1. A stop 23 (see FIGS. 1 and 5) is a fixed element holding the other end of the spring 22 in a generally constant position. The pull-down cam 7 is maintained in a lateral position by means of a guide 24 such that oscilatory and translatory motion of the film transport means is permitted, the said guide being affixed to the main support structure 5 by means of the bolt 25.

By means of this described structure the film transport means 10 is activated by a spring-biased means (the spring 22) which is active on the film transport means 10 to effect an inward translatory movement thereof for film perforation penetration and there is thus provided also a first cam operable at a predetermined cyclic speed with means operable by said first cam at said cyclic speed and active on the transport means in opposition to said spring-biased means for effecting an outwardly translatory movement of the transport means for film perforation disengagement for each film transport cycle.

For converting the operation of the projector from the predetermined cyclic speed to a slower speed to produce slow motion projection there is provided a second cam geared to said first cam and means operated by said second cam for selectively effecting the slow motion projection of the film transport means. To this end there is provided a gear 26 which preferably is made integral with the first cam 20 which meshes with a gear 27 rotatably mounted on a stud 28 affixed to the plate 16 of the projector. Gear 27 has twice as many teeth as gear 26 and thus rotates at one-half its speed. A cam 29 referred to as a second cam is preferably made integral with the gear 27, this cam being eccentrically mounted on the stud 28 as best shown in FIG. 1 of the drawings. By means of this construction the said second cam 29 is operable at a speed which is one-half and broadly speaking a fraction of the cyclic speed determined by the operation of cam 20 and pull-down cam 7.

Associated with the second cam 29 is a device which is manually movable into and out of operation or coaction with the second cam and said device is provided with a part movable into the transport path of the film transport means 10 to intercept the inward translatory movement thereof to inhibit its engagement with the first cam operated means when said device is manually moved into operation or coaction with said second cam. This manually movable device comprises a lever 30 rotatably mounted on a stud 31, the lever 30 being movable about said stud so that one of its arms 30ᵃ is movable into and out of operative engagement with the peripheral surface of the said cam 29. In the position of lever 30 depicted in FIG. 1 the said arm 30ᵃ is in constant contact with the peripheral surface of cam 29. In this position of lever 30 the extension 30ᵇ thereof is interposed in the transport path of the film transport means 10 as will be further explained hereinafter.

The lever 30 is spring biased by means of a heart shaped spring 32. Spring 32 has its central cusp 32ᵃ in engagement with a pin extension 34ᵃ of a disk 34. Spring 32 is mainained in lateral position by means of its open ends 32ᵇ extending through an aperture 30ᵈ in the arm 30ᶜ of the lever 30, the said open ends of the spring being appropriately bent for this purpose as best shown in FIGS. 1 and 4. The spring is maintained in its position by surfaces of a retainer ring 33 and a wall of the frame plate 16 (see particularly FIG. 4).

The disk 34 is affixed to a manually operated shaft 35, and a knob 36 is affixed to the shaft 35. The knob and shaft may be positioned in either of two rest positions determined by rotational movement in opposite directions of rotation of the disk 34 limited in its opposite directions of rotation by the edges of a slotted hole 16ᵃ formed in the frame plate 16 through which the pin extension 34ᵃ of the disk extends (see FIG. 4).

The spring 32 operates both as a compression spring and as an "over center" detent spring. When knob 36 (and disk 34) is rotated in a clockwise direction, pressure is exerted in that direction after is passes over center, said pressure being exerted by the cooperation of the pin extension 34ᵃ and the spring 32 at the cusp of the spring. The spring pressure is thereby translated against the arm etxension 30ᶜ of the lever 30, thereby causing said arm to rotate in a clockwise direction around the stud 31. The clockwise movement of lever 30 initiated by this action is limited by a fixed stop presented by an edge of a hole 16ᵇ in the plate 16 through which the arm 30ᶜ of lever 30 extends (see FIG. 4). The resulting effect of this action is to remove the cam follower 30ᵃ of lever 30 sufficiently from the cam 29 so that the surface of said cam will not strike the follower 30ᵃ at any angular position of the cam, thereby effectively removing the cam 29 from operation.

The said retainer 33 for the spring 32 is held in contact with the frame plate 16 by means of a flat spring 37 held in position by a retainer ring 45 mounted on the shaft 35. Rotation is imparted to the retainer 33 by means of the pin extension 34ᵃ of the disk 34 which engages a cooperating slot formed in the retainer 33 (see FIG. 4).

By means of this construction it will be seen, viewing FIG. 1, that the left arm extension 30ᵇ of lever 30 is arranged for operation in conjunction with an arm extension 38 formed integrally with the film transport means 10 under certain conditions. Thus when over center spring 32 is in the position shown in the drawings, cam 29 causes lever 30 to oscillate one cycle per two cycles of cams 7 and 20. During the first cycle of cams 7 and 20 the left extension arm 30ᵇ of lever 30 will be in its most clockwise position with the follower arm 30ᵃ in contact with cam 29 at its maximum radius. Immediate subsequent operation of the mechanism will therefore allow the arm extension 38 of the film transport means to translate in the inward direction under the influence of the spring 29 and under the cotrol of the first cam 20.

During the second cycle of cams 7 and 20, the follower arm 30ᵃ of lever 30 will be in contact with the lowest portion of said second cam 29, thereby causing the left extension 30ᵇ of lever 30 to be in its downward-most position. The result of this condition is that the end surface of the lever extension 30ᵇ is interposed in the transport path of the film transport means, that is, is interposed in the rightward translatory direction of travel of the arm extension 38 of the film transport means, thereby limiting the translatory travel of the film transport means to the right substantially less than the full distance permitted by cam 29. The result of this action is the prevention of penetration of the film perforations by the claw tip 39 of the film transport means (see FIGS. 1 and 5). Therefore, in the "forward" mode, when cam 10 strokes "down," the film will be advanced one frame for every second stroke. This action constitutes "slow motion." The same condition prevails when the described mechanism operates in reverse for reverse projection.

Slow motion projection may be initiated or stopped at any point in the operating cylce. If actuated when the film transport means 10 is in its maximum rightward position, the extension 30ᵇ of lever 30 will depress either until the follower extension 30ᵃ of the lever strikes the uppermost part of cam 29 or, if cam 29 is so disposed that its lowest portion is presented to the follower arm 30ᵃ, the arm extension 30ᵇ of the lever will then strike the edge of the arm extension 38 of the film transport means, contact being maintained until such time as the film transport means has been translated to the left, passing the end of the lever extension 30ᵇ, subsequently allowing said extension 30ᵇ to move into functioning position for slow motion projection.

"Still" projection is obtained by the provision of a manually controlled element which is selectively movable into the transport path of the transport means to intercept the inward translatory movement thereof to inhibit its engagement with the first cam operated means, thereby prevening or inhibiting film penetration. This element may be held in such intercepting position for any desired period. This operation is secured by manually interposing the left end 40ᵃ of a lever 40 into the transport path of the extension arm 38. Its function is similar to that of the extension arm 30ᵇ of lever 30 in that the claw tip 39 is thereby prevented from entering the film perforations, thereby preventing the film from being transported. This "still" mode of operation may take place over an indefinite period of time. The lever 40 is pivotable about the stud 31. A projecting arm 41 of lever 40 is an anchor for one end of a spring 42, and a projecting lug 43 on plate 16 is an anchor for the other end of spring 42. Spring 42 functions as an "overcenter" detent and maintains lever 40 in position at either end of its stroke. Motion is manually imparted to lever 40 by means of a suitable knob 44 attached thereto. FIG. 1 illustrates the "still" mechanism in its disengaged position.

The structure, operation and use of the film transport mechanism for the motion picture projector of the present invention and the many advantages thereof will be apparent from the above detailed description thereof. It will be further apparent that many changes may be made in the structure and design of the parts without departing from the spirit of the invention defined in the following claims.

We claim:

1. In a motion picture projector, in combination with an intermittent film transport means operable at a determined film transport cyclic speed, mechanism for changing the speed of movement of the film driven by said intermittent film transport means between (a) a film movement corresponding to said determined cyclic speed and (b) a film movement which is a fraction of said determined cyclic speed, said mechanism comprising a spring-biased means active on said film transport means to effect an inward movement thereof for film perforation penetration, a first cam operable at said cyclic speed, means operable by said first cam at said cyclic speed and active on the transport means in opposition to said spring-biased means for effecting an outward movement of the transport means for film perforation disengagement for each film transport cycle, a second cam operable at a speed which is a fraction of said cyclic speed, a device movable into and out of operative positions with reference to said second cam, said device having a part movable into the transport path of the transport means to intercept the inward movement of the transport means to inhibit its engagement with said first cam operated means when said device is moved into its operative position with reference to said second cam.

2. In the motion picture projector of claim 1, a pull-down cam operative on said transport means at said cyclic speed for effecting its film transport action, the said first cam being united to said pull-down cam.

3. In the motion picture projector of claim 1, a first gear fixed to said first cam, a second gear meshing with said first gear fixed to said second cam, said gears having relative diameters to effect the stated relative differenṯ cyclic speeds of said cams.

4. In the motion picture projector of claim 1, manual means for moving the said device between two positions, one into operation and the other out of operation with said second cam, said manual means including a compression and over-center detent spring active on said device for moving and maintaining the said device in its in and out positions.

5. In combination with the intermittent film transport means of claim 1, means for producing a "still" projection of the film comprising a manually movable element movable between two positions, said element having a part movable into and out of the transport path of the transport means when said element is moved from one to the other of its two positions.

6. In the combination of claim 5, an over-center detent spring active on said manually movable element for maintaining the said element in either one or the other of its two positions.

References Cited

UNITED STATES PATENTS

| 2,144,277 | 1/1939 | Wall | 226—62 |
| 3,306,697 | 2/1967 | Nemeth | 226—62 X |

RICHARD A. SCHACHER, Primary Examiner

U.S. Cl. X.R.

226—122, 160, 161